May 8, 1956　　　L. VOLLMER　　　2,744,251
AUTOMATIC INSERTER FOR SUTURING CLIPS
Filed June 4, 1953　　　3 Sheets-Sheet 1
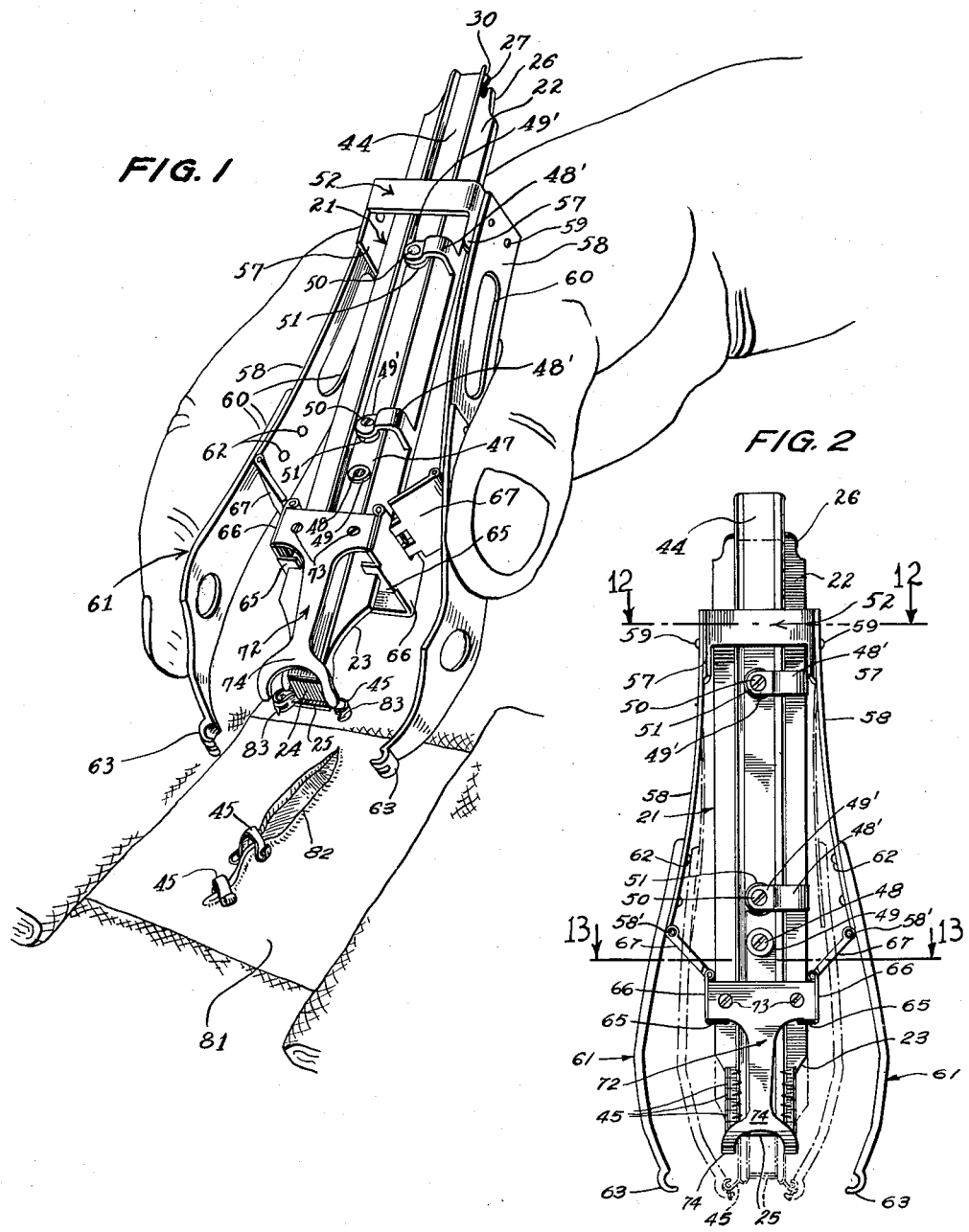
INVENTOR
*LEONHARD VOLLMER*
BY *L. S. Saulsbury*
ATTORNEY

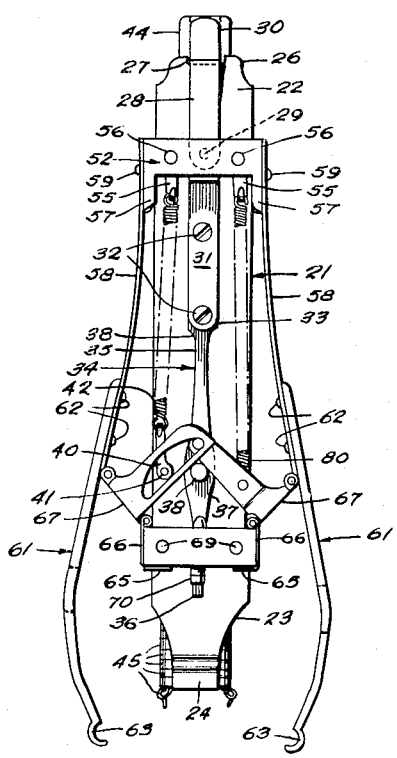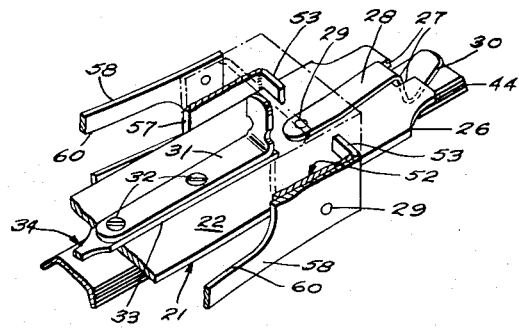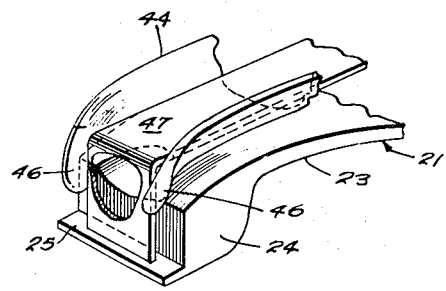

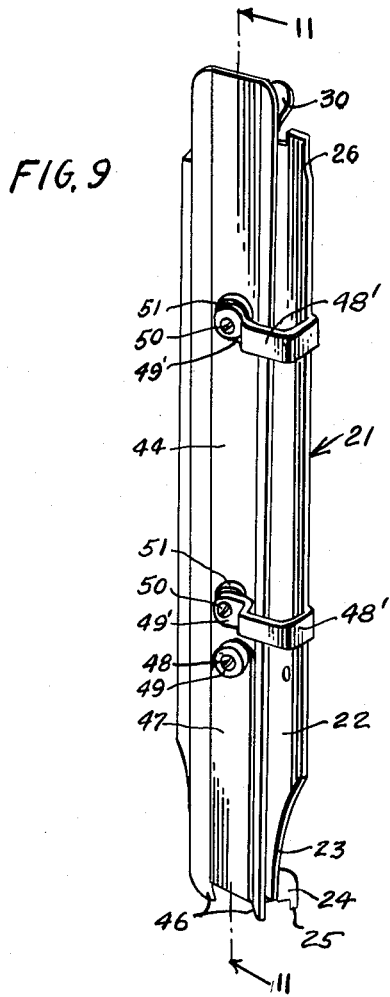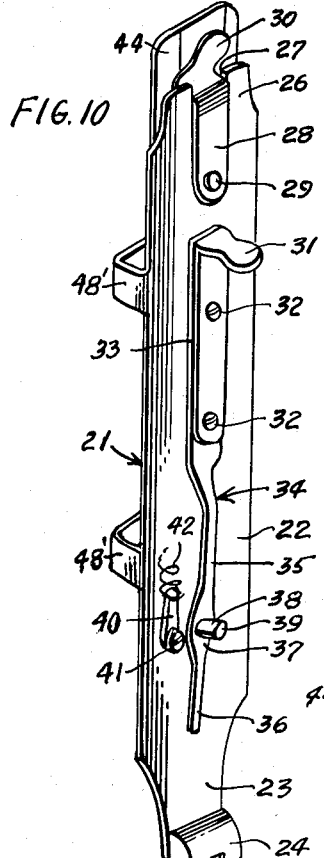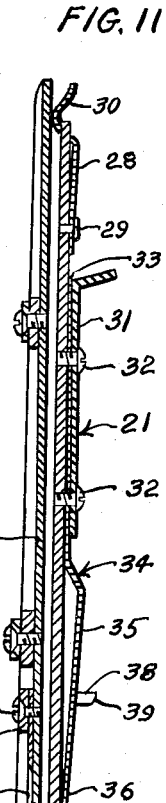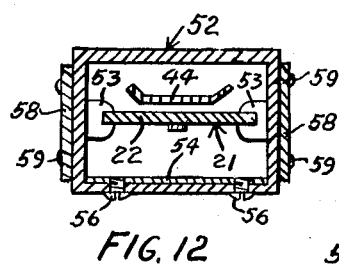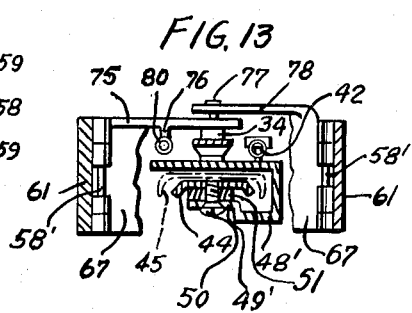

United States Patent Office 2,744,251
Patented May 8, 1956

2,744,251

AUTOMATIC INSERTER FOR SUTURING CLIPS

Leonhard Vollmer, New York, N. Y.

Application June 4, 1953, Serial No. 359,619

6 Claims. (Cl. 1—49.1)

This invention relates to an automatic inserter for suturing clips.

It is an object of the present invention to provide a suturing clip inserter which automatically feeds the suturing clips from a guide into position and grasping engagement between spaced retaining members for squeezing action to bring the skin portions together and wherein the discharging end of the guide is automatically released with the squeezing action of the parts being effected.

It is another object of the present invention to provide in a suturing clip inserter automatic feeding mechanism for the clips wherein the action of the member normally holding the end clip is fast timed for release automatically and instantly upon the ends of the operating parts being drawn to the proper spaced relationship to receive the clip so that control of the clip is not lost prior thereto, and wherein there is adequate means acting upon the opposite sides of the succeeding clip and those behind it to retain the group of clips free of the clip being worked.

It is another object of the present invention to provide an actuating lever operable upon the sliding parts resulting from a squeezing movement of two tong-like parts being squeezed together and wherein the lever, as the parts are brought closer together, releases from the tong parts in a spring acting upon the lever automatically as the lever is released causing the return of the slide which carries the supply of clips.

It is still another object of the present invention to provide a suturing clip inserter of the above type wherein the suturing clips may be inserted readily and easily without disassembling the parts of the device.

Other objects of the present invention are to provide an automatic inserter for suturing clips bearing the above objects in mind which is of simple construction, inexpensive to manufacture, has a minimum number of parts, is easy to operate between the fingers and thumb of the surgeon's hand, compact, of pleasing appearance and efficient in operation.

For other objects and a better understanding of the invention reference may be had to the following detailed description taken in connection with the accompanying drawing, in which:

Figure 1 is a perspective view showing a clip inserter showing the features of the present invention and showing the same in operative use;

Fig. 2 is a side elevational view thereof with the operating arms extended;

Fig. 3 is a side elevational view looking from the other side of Fig. 2, with the operating arms extended;

Fig. 4 is an enlarged fragmentary elevational view of a portion of the device shown in Fig. 3 with the operating arms extended;

Fig. 5 is a view similar to Fig. 4 but showing the operating arms in a contracted position just prior to release of the slide;

Fig. 6 is a vertical sectional view taken along the line 6—6 of Fig. 5;

Fig. 7 is a fragmentary perspective view of the upper end of the device; and

Fig. 8 is a fragmentary perspective view of the lower end of the device.

Fig. 9 is a front perspective view of the clip magazine separated from the other parts of the inserter;

Fig. 10 is a rear perspective view thereof;

Fig. 11 is a longitudinal sectional view taken on line 11—11 of Fig. 9;

Fig. 12 is an enlarged transverse sectional view taken on line 12—12 of Fig. 2;

Fig. 13 is an enlarged fragmentary transverse sectional view taken on line 13—13 of Fig. 2.

Referring now to the figures, 21 represents a slide assembly serving as a clip magazine which comprises an elongated body member 22 terminating at its lower end in an inwardly flared portion 23, Figs. 8 to 12, which terminates in an enlarged pusher foot or boss 24 having a shoulder stop lip or extension 25, substantially as illustrated. The upper end of body member 22 terminates in an inwardly flared portion 26 having a slot 27 at the end thereof, a leaf spring retainer 28 being secured to the forward face of member 22 by means of a rivet 29 and having a bent upper end 30 which is received in slot 27 through body member 22 (Fig. 7).

An L-shaped stop 31 is secured to the face of member 22 below spring 28 by means of screws 32 that secure shank 33 of a second leaf spring 34 intermediate the length of body member 22 in the manner as shown in Figs. 7, 10 and 11.

The leaf spring 34 continues downwardly with a narrow portion 35 separated from the narrow end 36 thereof by an enlarged portion 37, the narrow portion 35 being bowed (Fig. 6) thereby permitting the portion 37 to be spaced from the member 22 while the end 36 thereof remains in contact with the member 22. A lug 38 is secured to the outer face of enlarged portion 37 of leaf spring 34, and is provided with a cam surface 39 adapted to be engaged by an adjustable stop 70 in a manner to be hereinafter described in detail.

A hook member 40 (Figs. 3 and 5) is secured to the front face of the elongated body member 22 adjacent lug 38 by means of a rivet 41, serves to retain the lower end of a spring 42 to be referred to more in detail hereinafter.

Disposed on the underside of the member 22 is a longitudinally extending guide bar 44 (Figs. 1 and 2) over which suturing clips 45 are placed and slide downwardly under their own weight. The guide bar 44 is of channel shaped cross section to accommodate the configuration of the clips 45 which are placed on the guide bar 44 intermediate the latter and the rear face of member 22 after first pulling the spring retainer 28 out of the slot 27 by means of bent end 30. Once the clips 45 are on the guide bar, the spring 28 will retain them against outward displacement from the upper end of the device, as will be obvious. The spring 28 is pivotally mounted on the rivet 29 to permit it to be swung to the side when the inserter is being loaded with suturing clips.

The clips come to a stop at the forward end of the guide bar 43, which is bifurcated at 46 (Fig. 8) where they are retained by an L-shaped leaf spring stop 47 secured within the guide bar 44 by means of a screw 48 and a washer 49. The bent laterally extending end of the spring 47 is freely spaced from the face of the pusher foot 24 to permit the lowermost clip to slide downwardly below the pusher foot 24 and against the laterally bent end of the spring stop, the foremost clip being retained against displacement off the laterally bent end of spring stop 47 by means of the shoulder stop lip 25 on the pusher foot 24 (Fig. 8). Thus, when the clips are fed onto the guide bar 44 from the upper end of the device, they will fall to the lower end by their own weight, with the lowermost clip sliding down and laterally to come to rest between the laterally extending end of spring stop 47 and the bottom of pusher foot 24.

The guide bar 44 is secured to the body 22 by a pair of overlying brackets 48' integrally formed along one longitudinal edge of the elongated body 22 and extending across the rear face thereof to terminate in downwardly bent ends 49' respectively secured to the bar 44 by means of screws 50 and space washers 51. By the brackets 48, the bar 44 which receives the clips 45 is held slightly spaced from the rear face of the elongated body member 22.

A boxlike frame 52 surrounds the upper end of body member 22 and is provided at each lateral end with inwardly extending lugs 53 that have respectively slots slidably receiving the longitudinal edges of the body member 22 (Figs. 7 and 12), the upward displacement of body member 22 being limited by stop 31 abutting frame member 52.

A plate 54 having hook portions 55 is secured to the inner face of frame 52 by means of screws 56. One of the hook portions 55 serves to retain the upper end of spring 42 (Fig. 3) to normally urge the body member 22 upwardly and the stop 31 into engagement with the frame 52.

The opposite sides of the frame 52 are provided with downwardly extending portions 57 to the outer faces of which are secured respectively depending spring members 58 by means of rivets 59. The spring members 58 are provided with openings 60 to facilitate their flexing in a manner to be hereinafter described.

Opposing tong parts 61 are respectively secured at their upper ends to the respective outer faces of spring members 58 by means of rivets 62, the lower ends of tong part 61 terminating in opposing hook ends 63.

A second frame member 64 surrounds the lower end of bar 44 and member 22 and is provided on opposite sides with inwardly extending lugs 65 (Fig. 1) which are respectively provided with slots receiving the opposite longitudinal edges of body member 22.

Opposing hinge plates 66 are respectively suitably secured to opposite sides of the frame member 64 and hingedly cooperating therewith are respective hinge plates 67, the upper ends of which are hingably connected at 58' to the lower ends of springs 58.

A bearing bracket 68 is mounted on the underface of frame member 64 by means of screws 69, the bearing member 68 being internally to receive the bullet nosed adjustable stop 70 having a slotted lower end 71 for manipulation by a screw driver or the like. The bullet nosed upper end of the stop 70 is adapted to abut the cam face 39 of lug 38 upon downward movement of the body member 22 in a manner to be hereinafter described.

A T-shaped bracket 72 is secured to the opposite outer face of frame member 64 by means of screws 73, Figs. 1 and 2, the lower end of T-shaped bracket 72 terminates in an inwardly curved bifurcated portion 74, substantially as illustrated. The ends of bifurcated portion 74 normally extend downwardly and below the bifurcated ends 46 of the guide bar 44, the bifurcated portion 74 also being laterally displaced from the bifurcated portions 46 of guide bar 44. Thus, upon downward movement of the body member 22 and guide bar 44, all of the clips except the lowermost suture clip 45 will be engaged by the bifurcated portion 74 to limit their downward movement. As the guide bar 44 rises above the bifurcated portion 74, the suture clips 45 will again be out of contact with the bifurcated portion 74 and will drop downwardly with the lowermost clip moving into the space intermediate pusher foot 24 and the bent portion of spring 47 to replace the discharged clip.

A trip lever 75 is suitably mounted along one longitudinal edge of one of the plates 67 above the front face of member 22. A lug 76 extends toward the body member 22 on the inner face of trip lever 75 while a second lug 77 is provided on the end of trip lever 75 and extends outwardly away from member 22. It will be noted that the lower edge of trip lever 75 will engage the lug 38 whereby to move downwardly the member 22 and guide bar 44. A cooperating trip lever 78 is suitably secured along the forward longitudinal edge of the other hinge plate 67 and is provided with an elongated slot 79 having an arcuate upper edge along which the lug 77 rides, as shown in Figs. 4 and 5. Thus as the tong parts 61 are brought together, the trip lever abutting pin 38 lowers spring 34, plate 22 and guide bar 44 until lug 38 strikes stud 70 which due to the cam surface 39 forces the spring 34 and stud 38 out from under the trip lever 75, as shown in Fig. 5. Release of lug 38 from the trip lever 75 now permits upward movement of the spring 34, member 22 and guide bar 44 under action of the spring 42. The lug 76 is connected to the hook portion 55 by means of spring 80 serving to normally retain the trip lever 75 in a raised position limited by the stop 31 and disposing the tongs 61 in their open positions.

Thus, when the tongs 61 are open, the parts will be disposed in the manner shown in Figs. 1 through 3, with the guide bar 44 and member 22 along with clips 45 being disposed upwardly from the hooked ends 63. Upon squeezing the tong parts 61 together as shown by dot and dash lines in Fig. 2, the lug 77 will ride slot 79 to the position of Fig. 5, the lower edge of trip lever 75 forcing the lug 38 downwardly and carrying therealong the member 22 and guide bar 44 along with the stacked clips 45. As this action occurs, all but the lowermost clip 45 will be retained against downward displacement by the bifurcated portion 74 of the T-shaped bracket 72. The ends of the lowermost clip 45 are then delivered downwardly where they are engaged by the contracting hook ends 63. When the ends of the clip 45 are engaged between hook ends 63, the lug 38 comes into abutment with adjustable stop 70, where the cam face 39 forces the lug 38 downwardly out of engagement with the lower edge of trip lever 75 and permits the guide bar 44, member 22 and the remaining clips 44 to move upwardly to their initial position under the action of springs 42 and 80. The uppermost position is limited by the stop 31 abutting the bottom of frame member 52. Upon release of the tong part 61 the trip levers 75 and 78 will be moved upwardly by spring 80, the lower edge of trip lever 75 passing over the spring mounted lug 78, due to the deflection of the spring 34, after which the lug 38 will again snap outwardly into the position of Fig. 4, to be again engaged by the lower edge of trip lever 75 upon downwardly moving of the latter. It will be noted that the lowermost clip will be automatically disengaged from between the pusher foot 24 and lateral portion of spring 47 when the slide assembly moves upwardly due to the resilience of the spring 47 permitting the lowermost clip to escape.

As the device is applied to the skin 81, and more particularly to wound 82, the prongs 83 will embed themselves in the skin at the sides of the wound under the action of the hook end 63, which action draws the tongs together and bends the body portion of the clips, as shown in Fig. 1. Thus, the suturing clips are automatically delivered quickly and efficiently and bent into the desired relationship, a clip being delivered and bent with each contraction of the tong parts 61, which automatically return to their extended position by spring means, and permitting the delivery of the next clip upon the next contraction. The number of clips which may be so delivered is limited only by the length of the guide bar 44. It will be noted that the clips themselves may be fed onto the guide bar 44 merely by rotating the spring 28 out of engagement with slot 27 and then dropping the clips thereon, the clips moving downwardly under their own weight. Upon return of the spring 28 to its position within slot 27, the clips will be safely retained in operative position and prevented against upward displacement. The above procedure will be followed until the wound is finally closed by the skin portions.

While various changes may be made in the detail construction, it shall be understood that such changes shall be within the spirit and scope of the present invention as defined by the appended claims.

What is claimed is:

1. An automatic inserter for suturing clips comprising a box-like frame, depressible tong parts connected to opposite sides of the box-like frame and having specially formed ends adapted to receive and retain a suturing clip, a magazine slide assembly mounted within the box-like frame and extending longitudinally between the tong parts, means co-acting between the slide assembly and the tong parts and operable upon the slide assembly as the tong parts are depressed to cause advancement of the magazine slide assembly, said co-acting means including a second box-like frame and said second box-like frame aligned with the first box-like frame and slidably receiving said magazine slide assembly to guide the lower end thereof, said magazine slide assembly being adapted to contain a column of suturing clips and having means for retaining the column of suturing clips while permitting the advancement of the lowermost clip as the slide assembly is advanced to deliver the lowermost clip to the specially formed end of the tong parts, automatic release means on said magazine operable by said co-acting means when the magazine slide assembly has been advanced to its clip delivery position to release the magazine and the lowermost clip to the specially formed ends of the tong parts, return spring means connected between the first mentioned box-like frame and the slide assembly for normally urging the slide assembly to its retracted position, said tong parts being operative with further closing pressure after the slide assembly has been released to close the clip upon the skin or work parts being joined together.

2. An automatic inserter for fixing suturing clips as defined in claim 1, and said means for advancing the slide assembly longitudinally between the tong parts comprising a first trip lever carried by said double hinge means, a second lever carried by said double hinge means, said second lever having an arcuate slot cooperating with a lug carried at the end of said first trip lever, tension means connected between said first boxlike member and said first trip lever to bias said tong parts outwardly, a spring mounted lug carried by the adjacent face of said slide assembly and adapted to be engaged by the lower edge of said first trip lever to carry the slide assembly to its clip delivery position, said lug having a cam surface, a stud stop adjustably carried by said second box member and adapted to engage the cam surface whereby to urge said lug out of engagement with said trip lever when said slide assembly reaches its clip delivery position, and second tension means connected between said slide assembly and said first boxlike member to bias the slide assembly toward its retracted position.

3. An automatic inserter for fixing suturing clips, as defined in claim 2, including a stop fixedly carried by the slide assembly and adapted to abut said first boxlike member to limit the upward movement of the slide assembly toward its retracted position.

4. An automatic inserter for fixing suturing clips as defined in claim 1, said slide assembly comprising an elongated body member slidable within said boxlike members and provided at its lower end with a pusher foot, a guide bar extending the length of said elongated body member and fixedly connected to the face thereof in freely spaced relationship, said guide bar being adapted to receive the suture clips thereon behind said elongated body member for slidable movement thereon, the lower end of said guide bar being provided with a bifurcated portion curving beyond and over said pusher foot and spaced therefrom, a substantially L-shaped spring secured to the lower end of said guide bar and having a lateral portion passing between said bifurcated portion and extending below the bottom of said pusher foot, said pusher foot having a flange extension adapted to be abutted by the end of said lateral portion of said spring.

5. An automatic inserter for fixing suturing clips as defined in claim 4, the upper end of said guide bar extending upwardly above the upper end of said elongated body member, said elongated body member at the upper end thereof having a slot, and a leaf spring secured to the face of said elongated body member at the top thereof and having a laterally bent portion passing through said slot and adapted to resiliently abut the adjacent face of said guide bar.

6. An automatic inserter for fixing suturing clips as defined in claim 4, including a bifurcated portion fixedly connected to said second boxlike member above the said guide bar and straddling the magazine and the clips to hold the main column of the clips while the one clip is delivered to the ends of the tongs, said bifurcated portion spanning said bifurcated portion of said guide bar whereby to permit the longitudinal movement of the pusher foot therebetween and the engagement of the ends of the suturing clips.

References Cited in the file of this patent

UNITED STATES PATENTS

| 2,594,102 | Vollmer | Apr. 22, 1952 |

FOREIGN PATENTS

| 632,973 | France | Oct. 17, 1927 |
| 682,658 | France | Feb. 17, 1930 |